United States Patent

Skoog

[15] 3,675,109

[45] July 4, 1972

[54] INFORMATION TRANSMITTING DEVICE

[72] Inventor: Hilding G. Skoog, Balsta, Sweden

[73] Assignee: Sevenska Dalaregissster AB, Solna, Sweden

[22] Filed: Nov. 18, 1970

[21] Appl. No.: 90,679

[52] U.S. Cl. ..................................321/2, 178/66 A, 178/88, 331/117

[51] Int. Cl. ..................................H02m 3/22

[58] Field of Search ...............321/2; 331/117, 173; 329/109; 340/172; 178/66 A, 88, 70 T; 330/10

[56] References Cited

UNITED STATES PATENTS

| | | | |
|---|---|---|---|
| 3,209,161 | 9/1965 | Lovci et al. | 178/66 A |
| 2,996,680 | 8/1961 | Barry et al. | 329/109 X |
| 3,088,079 | 4/1963 | Quigley | 331/117 X |
| 3,478,225 | 11/1969 | Bryant | 331/173 X |

*Primary Examiner*—William M. Shoop, Jr.
*Attorney*—Norman Friedman, Stephen E. Feldman, Morris I. Pollack, Arthur T. Groeninger and Philip Furgang

[57] ABSTRACT

A device for transmitting information, represented by different levels of DC-voltage, from a transmitter to a receiver galvanically separated from the transmitter. A transformer, one winding of which forms a part of a LC-oscillator, and the second winding of the transformer is connected to a first transistor via a diode, the transistor in emitter-follower configuration. A second transistor, also having an emitter follower configuration is a part of the LC-oscillator. A second output diode is connected to the emitter of the second transistor. The arrangement being so designed that the voltage level appearing at the cathode of the second diode corresponds to the input voltage level appearing at the input of the first transistor.

9 Claims, 2 Drawing Figures

INFORMATION TRANSMITTING DEVICE

This invention refers to a device for transmission of information, especially digital information represented by different levels of DC-voltage which can be transmitted from a transmitter to a receiver galvanically separated from the transmitter.

By transmission of information, represented by different levels of DC-voltage, from a transmitter to a receiver connected to the transmitter by a wire the transmitter and the receiver usually need galvanic interconnection. If the distance between the transmitter and the receiver is long, there will turn up problems to obtain the same reference potential (earch potential), at the transmitter and the receiver locations respectively. These problems will be conspicuous especially when a locally situated transmitter is supplied by current from a receiver having a central unit.

During transmissions of this kind also problems with noise signals will turn up, the noise signals entering via the wire connection between the transmitter and the receiver and via connections to earth at the transmitter and the receiver. A solution to this problem is to galvanically separate the transmitter and the receiver by a transformer, however, doing so the signals representing the information need to be of AC-type, as no DC levels of voltage can be transmitted via a transformer. Thus, the task of this invention is to provide a device by which information, represented by different levels of DC-voltage, can be transmitted from a transmitter to a receiver via a wire connection, the receiver being galvanically separated from the transmitter by a transformer. The problem is solved by giving the invention the specific features stated in the characterizing parts of the claims.

The invention will now be described in detail by an example carried out having a transformer cooperating with a Colpitt oscillator. According to the invention, the oscillator has to belong to the group of LC-oscillators. The choice, however, of oscillator is not too crucial and it can for instance be a Hartley oscillator as well. It is necessary that the oscillator has an inductance for transferring its oscillations by magnetic coupling to another inductance, where the different levels of DC-voltage to be transmitted appear.

In connection with the following part of the specification the enclosed drawing will be considered.

Figure 1:
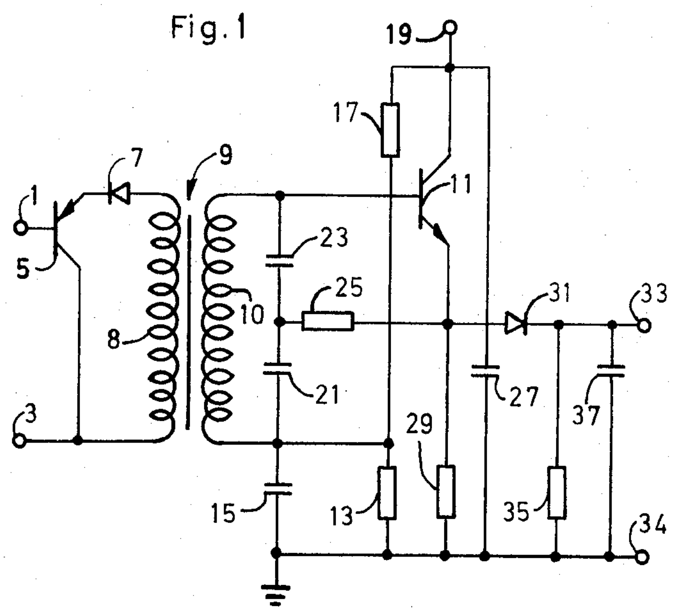
FIG. 1 shows a circuit diagram.
Figure 2A:
FIG. 2 is a diagram showing the waveforms for voltages appearing at different points in FIG. 1.
Figure 2B:
Figure 2C:

Input signals, according to FIG. 2, line a, are fed from a transmitter (not shown) to two input terminals 1 and 3 in FIG. 1, via a wire connection (now shown) between the transmitter and the receiver. The terminal 1 is connected to the base of a PNP-transistor 5 working, as an emitter follower. The emitter of the transistor is connected to the cathode of a diode 7, the anode of which being connected to one end of the primary winding 8 of a transformer 9. The other end of the primary winding 8 is connected both to the collector of the transistor 5 and to the input terminal 3, the potential of the input terminal can vary within a great interval without any failure of the device. The transistor 5 is arranged for achieving a load of sufficiently low impedance, without overloading the transmitter.

The secondary winding 10 of the transformer 9 forms a part of an oscillator of LC-type, more precisely a Colpitt type oscillator. One end of the secondary winding is connected to the base of a NPN-transistor 11 and the other end is via a parallel connection consisting of a resistor 13 and a capacitor 15 connected to a reference potential 0 V. The other end of the secondary winding is via a resistor 17 connected to a terminal 19 having a potential of +18V. The resistors 13 and 17 hereby provide the base of the transistor 11 with proper voltage. To the secondary winding 10 there are connected two capacitors in series and the junction between the capacitors is connected to the emitter of the transistor 11 via a resistor 25. The resistor 25 is used for limiting to a proper level the amplitude of the oscillations produced by the oscillator. The resistor 13 is shortcircuited by the capacitor 15 at the oscillation frequency, being about 2 MHz in this special embodiment, so the collector of the transistor 11 is, for AC-signals, connected via a bypass capacitor 27 and a capacitor 15 to the other end of the secondary winding 10. The collector of the transistor 11 is also connected to the terminal 19 for a DC-power supply. The emitter of the transistor 11 is, via a resistor 29, connected to the reference potential 0 V and, via a diode 31, connected to an output terminal 33. Output signals are supplied between the terminal 33 and one output terminal 34 connected to the reference potential 0 V. The oscillations of high frequency obtained in the oscillator are modulated with the input signals and the demodulated output signal, between output terminals 33 and 34, appears after the diode 31 across a resistor 35 and a capacitor 37, the other ends of these components being connected to the reference potential 0 V.

The function of the device shown in FIG. 1 will now be described with reference to FIG. 2. The input signals to terminals 1 and 3 have the shape shown on line a in FIG. 2. The input signals shown do not represent any special information, the purpose is just to demonstrate the function of the circuit at two levels which can represent binary information, the levels in this case being a low one of 0 V and a high one of +18V.

If the device is carried out, the oscillator is so designed that it under all circumstances works at a frequency of about 2 MHz. This relatively high frequency of the oscillations is necessary as the input signals have frequencies varying between 0 and 12 KHz, i.e. in this special case the information is represented by pulses of rectangular shape instead of different levels of DC-voltage with time duration. It is, however, the levels and not the changes of levels that are detected. When the oscillator works, a voltage of high frequency is transformed to the primary winding 8 of the transformer 9 from the secondary winding 10 which forms a part of the circuit of the oscillator. This circuit consists, in addition to the winding 10, of the capacitors 21 and 23. This voltage of high frequency continuously is compared with the voltage of the emitter of the transistor 5, this voltage being dependent of the voltage applied to the input terminal 1 and hereby the impedance across the primary winding 8 can vary between a minimum valual when the diode carries current and the transistor 5 saturates and a maximum value when the diode 7 carries no current.

The described circuit is designed for transmitting binary information and therefore the two extreme values for the impedance formed by the transistor 5 and the diode 7 are chosen. When the terminal 1 has a low voltage level (0 V) the transistor 5 saturates during the positive half periods of the high frequency voltage and the primary winding is almost shortcircuited. Hereby, the oscillation circuit of the oscillator is heavily loaded and the voltage amplitude on the emitter of the transistor 11 goes small, see line *b* in FIG. 2. The resulting low voltage level appearing at the output terminal can be seen on line *c*, FIG. 2.

When the terminal 1 has a high voltage level (+18 V) the diode 7 is blocking and the oscillation circuit of the oscillator is not loaded at all. The result of this is that the amplitude of the voltage at the emitter of the transistor 11 goes high, see line *b* in FIG. 2, and thus the level for the voltage appearing at the output terminal 33 also goes high, see line *c* in FIG. 2. The feature described above, the device carried out and shown on the drawing is not intended to limit the invention. The invention is only limited by the enclosed claims. Thus, for instance, the oscillator can be modified within the scope of the Colpitt oscillator and it can also define any other type of LC-oscillator within the scope of the invention.

While a specific embodiment of my invention has been illustrated, it will be appreciated that my invention is not limited thereto, since many modifications may be made by one skilled in the art and the appended claims are intended to cover all such modifications as fall within the true spirit and scope of my invention.

I claim:

1. A device for transmitting information represented by different levels of DC-voltage from a transmitter to a receiver galvanically separated from the transmitter comprising;

a transformer, a first rectifier connected to the primary winding of said transformer, a second rectifier, a transmitter in series with said first rectifier, an oscillator of the Colpitt's LC- type part of which is formed by the secondary winding of the transformer, and includes a transistor, and wherein the secondary winding is connected between a base and collector of said transistor and further wherein capacitors are connected between said base and the emitter and between the emitter and the collector of the transistor, and wherein said second rectifier is coupled to the output of said oscillator, and whereby a DC-voltage of a specific level supplied to the primary winding of the transformer will cause a DC-voltage of a corresponding level to appear as an output signal via said second rectifier.

2. A device for transmitting information represented by different levels of DC-voltage from a transmitter to a receiver comprising;

a transformer having primary windings and secondary windings, the primary windings galvanically coupled to the transmitter, and an oscillator of the inductive-capacitive type, having its inductive portion formed by the secondary windings of the transformer, galvanically separated from the transmitter by said transformer.

3. The device of claim 5 wherein both windings of the transformer have windings in the same direction and the transistor is an NPN transistor operating as an emitter follower and the second rectifier is connected to the emitter of the transistor so that an increase in the input voltage to the primary winding of the transformer results in an increased output voltage level after the second rectifier.

4. The device of claim 5 wherein the primary winding of the transformer includes a transistor, its base-emitter being connected in series with the first rectifier and the primary winding and its collector-emitter being connected in parallel with a series circuit formed by the first rectifier and the primary winding, DC-voltages which shall be transmitted being supplied between the base and the collector of the transistor.

5. The device of claim 2 wherein only the secondary windings of the transformer form the inductive portion of the oscillator and is directly coupled in said oscillator.

6. The device of claim 2 further including, variable impedance means, coupled to the primary windings of said transformer, responsive to the magnitude of the DC-voltage from the transmitter, for controlling the magnitude of the oscillator's output signal.

7. The device of claim 2 further including, variable impedance means, coupled to the primary windings of said transformer, responsive to the magnitude of the DC-voltage from the transmitter and the voltage induced in the primary winding of the transformer from the secondary windings of the oscillator.

8. The device of claim 7 wherein said variable impedance means includes an electronic valve means and a unidirectional conducting means, said electronic valve means being controlled by said DC-voltage and the voltage induced in the primary windings of the transformer from the secondary windings of the oscillator.

9. The device of claim 8 wherein the electronic valve means includes a transistor and wherein said unidirectional conducting means includes a diode, and wherein said diode and transistor are in series with the primary windings of said transformer.

* * * * *